US012647824B1

(12) United States Patent
Cheon

(10) Patent No.: US 12,647,824 B1
(45) Date of Patent: ***Jun. 2, 2026

(54) METHODS AND APPARATUS FOR DISTRIBUTING BASEBAND SIGNAL PROCESSING OF FIFTH GENERATION (5G) NEW RADIO UPLINK SIGNALS

(71) Applicant: Marvell Asia Pte, Ltd., Singapore (SG)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 247 days.

This patent is subject to a terminal disclaimer.

(21) Appl. No.: 18/516,955

(22) Filed: Nov. 22, 2023

Related U.S. Application Data

(63) Continuation of application No. 17/364,435, filed on Jun. 30, 2021, now Pat. No. 11,843,972, which is a continuation of application No. 16/537,109, filed on Aug. 9, 2019, now Pat. No. 11,071,010.

(60) Provisional application No. 62/853,638, filed on May 28, 2019.

(51) Int. Cl.
| | |
|---|---|
| *H04W 4/00* | (2018.01) |
| *H04W 24/10* | (2009.01) |
| *H04W 28/06* | (2009.01) |
| *H04W 72/0446* | (2023.01) |
| *H04W 72/0453* | (2023.01) |

(52) U.S. Cl.
CPC ........... *H04W 28/06* (2013.01); *H04W 24/10* (2013.01); *H04W 72/0446* (2013.01); *H04W 72/0453* (2013.01)

(58) Field of Classification Search
CPC . H04W 28/06; H04W 24/10; H04W 72/0446; H04W 72/0453
See application file for complete search history.

(56) References Cited

U.S. PATENT DOCUMENTS

| | | | | |
|---|---|---|---|---|
| 11,071,010 B2 * | 7/2021 | Cheon | .................. | H04W 92/12 |
| 11,843,972 B2 * | 12/2023 | Cheon | ............... | H04W 72/0453 |

(Continued)

FOREIGN PATENT DOCUMENTS

| | | | | |
|---|---|---|---|---|
| CA | 2515167 C | * | 3/2010 | ........... H04L 27/366 |
| CA | 3042851 A1 | * | 5/2018 | ............ H04W 72/20 |

(Continued)

*Primary Examiner* — Thai Dinh Hoang

(74) *Attorney, Agent, or Firm* — JW Law Group; James M. Wu

(57) ABSTRACT

Methods and apparatus for distributing baseband signal processing of fifth generation (5G) new radio uplink signals. In one embodiment, an apparatus includes a radio frequency ("RF") interface, direct current ("DC") remover, time domain ("TD") measurement circuit, and a compression block. The RF interface is able to receive uplink transmissions containing data from a communication network. While the DC remover generates DC adjusted signals by removing DC bias from the received uplink transmissions, the TD measurement circuit is configured to measure a TD power level associated with the DC adjusted signals. The compression block, in one aspect, is operable to generate compressed uplink base band packets in response to the uplink transmissions and the TD power level. The compressed packets is subsequently transmitted over a transmission medium to the central office.

36 Claims, 5 Drawing Sheets

UPLINK SIGNAL COMPRESSOR

(56)           References Cited

U.S. PATENT DOCUMENTS

2016/0198293 A1*   7/2016   Mitsuze ................ H04L 41/507
                                                 455/456.1
2017/0251493 A1*   8/2017   Zhang ................. H04L 27/2626
2017/0373890 A1*   12/2017   Fertonani ................ H04L 25/02

FOREIGN PATENT DOCUMENTS

WO      WO-2015172290 A1 *   11/2015   ......... H04L 27/2647
WO      WO-2023223217 A1 *   11/2023   ............. H04L 45/24

* cited by examiner

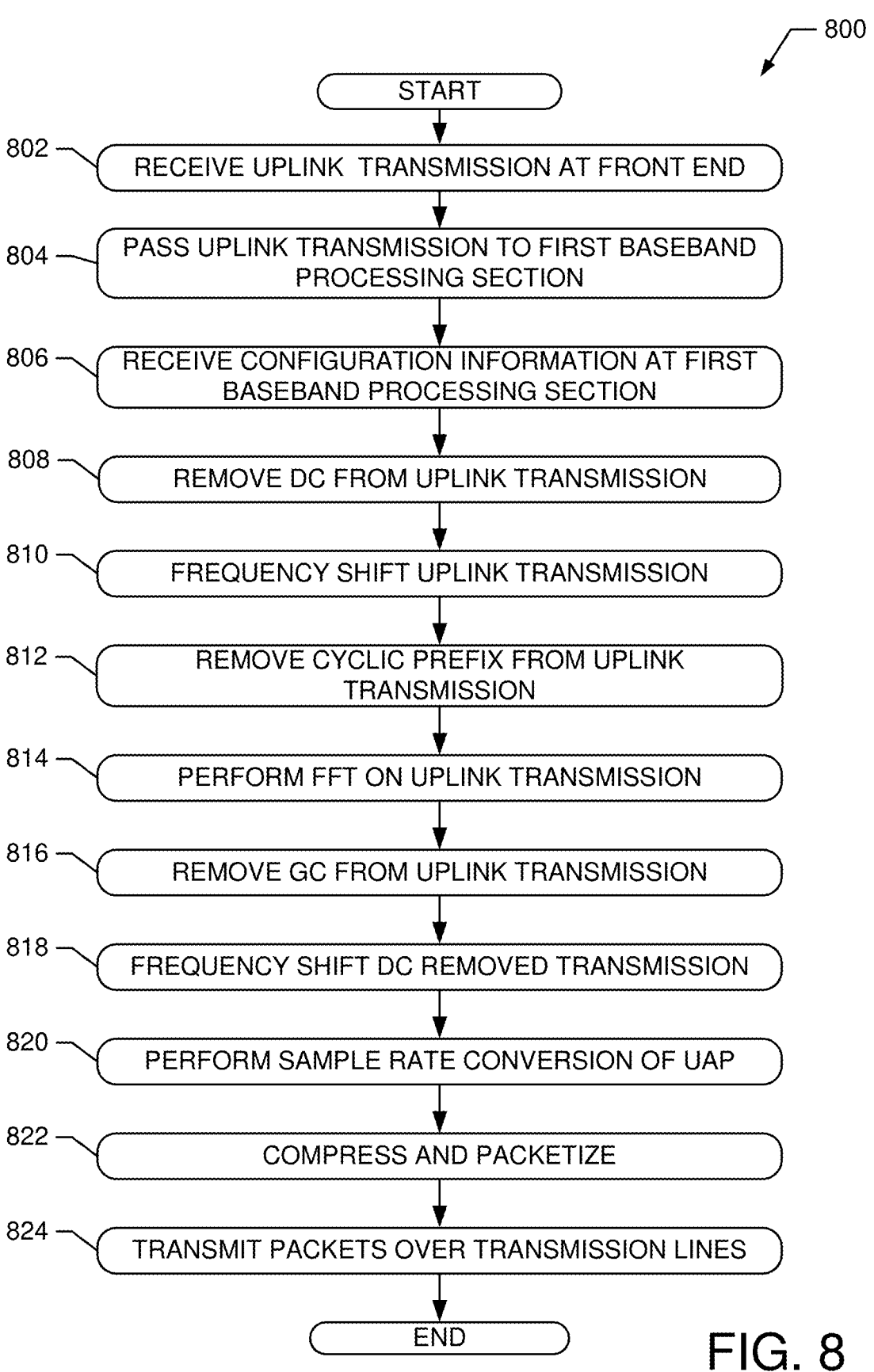

800

START

802 — RECEIVE UPLINK TRANSMISSION AT FRONT END

804 — PASS UPLINK TRANSMISSION TO FIRST BASEBAND PROCESSING SECTION

806 — RECEIVE CONFIGURATION INFORMATION AT FIRST BASEBAND PROCESSING SECTION

808 — REMOVE DC FROM UPLINK TRANSMISSION

810 — FREQUENCY SHIFT UPLINK TRANSMISSION

812 — REMOVE CYCLIC PREFIX FROM UPLINK TRANSMISSION

814 — PERFORM FFT ON UPLINK TRANSMISSION

816 — REMOVE GC FROM UPLINK TRANSMISSION

818 — FREQUENCY SHIFT DC REMOVED TRANSMISSION

820 — PERFORM SAMPLE RATE CONVERSION OF UAP

822 — COMPRESS AND PACKETIZE

824 — TRANSMIT PACKETS OVER TRANSMISSION LINES

END

FIG. 8

METHODS AND APPARATUS FOR DISTRIBUTING BASEBAND SIGNAL PROCESSING OF FIFTH GENERATION (5G) NEW RADIO UPLINK SIGNALS

PRIORITY

This application is a continuation of a U.S. patent application having an application Ser. No. 17/364,435, filed on Jun. 30, 2021, and entitled "Methods and Apparatus for Distributing Baseband Signal Processing of Fifth Generation (5G) New Radio Uplink Signals," issued into a U.S. patent with a U.S. Pat. No. 11,843,972 on Dec. 12, 2023, which is a continuation of a U.S. patent application having an application Ser. No. 16/537,109, filed on Aug. 9, 2019, and entitled "Methods and Apparatus for Distributing Baseband Signal Processing of Fifth Generation (5G) New Radio Uplink Signals," issued into a U.S. patent with a U.S. Pat. No. 11,071,010 on Jul. 20, 2021, which further claims priority from a U.S. Provisional Application No. 62/853, 638, filed on May 28, 2019, and entitled "Method and Apparatus for Baseband Signal Compression of 5G NR Uplink," all of which are hereby incorporated herein by reference in their entirety.

FIELD

The exemplary embodiments of the present invention relate to operation of telecommunications networks. More specifically, the exemplary embodiments of the present invention relate to receiving and processing data streams for use in wireless telecommunication networks.

BACKGROUND

With a rapidly growing trend of mobile and remote data access over a high-speed communication network such as Long Term Evolution (LTE), fourth generation (4G), fifth generation (5G) new radio (NR) cellular services, accurately delivering and deciphering data streams become increasingly challenging and difficult.

During uplink operation, radio frequency (RF) signals received at a remote site from user equipment need to be transmitted to a central office. Typically, wireless operators utilize leased data lines to transmit information between the central office and the remote sites. It is desirable to use these leased lines as efficiently as possible to allow the use of less expensive lines or to allow the transmission of more channels using the existing lines.

Therefore, it is desirable to have a system that enables efficient transmission of received uplink signals from remote sites to a central office.

SUMMARY

In various exemplary embodiments, methods and apparatus for a distributed baseband processing system are provided. The distributed baseband processing system operates to facilitate efficient transmission of received uplink signals from remote sites to a central office. In an embodiment, the distributed baseband processing system utilizes a first baseband processing section that comprises an uplink front-end signal compressor that integrates FFTs, filters and front-end signal processing for 5G NR uplink signals, such that all the information of a 5G uplink channel can be compressed significantly without losing any precision. The output of the compressor is easily packetized for Ethernet transfer. A second baseband processing section at the central office receives the packetized transmission and recovers the uplink data. The second baseband processor also transmits configuration parameters that control the operation of the first baseband processing section. As a result, the transmission lines between the central office and the remote site are efficiently utilized to allow the use of less expensive transmission lines or to allow the transmission of more channels using the existing lines.

In an embodiment, the baseband signal processor at the central office controls the compressing devices directly, and this achieves flexible data compression according to 5G uplink traffic in the time/frequency domain without losing any information. Since the uplink signal frontend processing is being done at the remote radio head, the baseband signal processor at the central office will have more processing margin.

In an embodiment, a method is provided that includes receiving uplink transmissions having user data, receiving configuration parameters, and performing a first portion of baseband processing that compresses the uplink transmissions using the configuration parameters to generate compressed packets. The method also includes transmitting the compressed packets over a transmission medium to the central office that performs a second portion of the baseband processing to obtain the user data.

In an embodiment, an apparatus is provided that includes a radio frequency interface that receives uplink transmissions that have user data, and a first baseband processing section that receives configuration parameters, compresses the uplink transmissions using the configuration parameters to generate compressed packets, and transmits the compressed packets over a transmission medium to the central office where a second baseband processing section processes the compressed packets to obtain the user data.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

FIG. 8 shows an exemplary method for performing uplink baseband compression in accordance with exemplary embodiments of a distributed baseband processing system.

DETAILED DESCRIPTION

Figure 1:
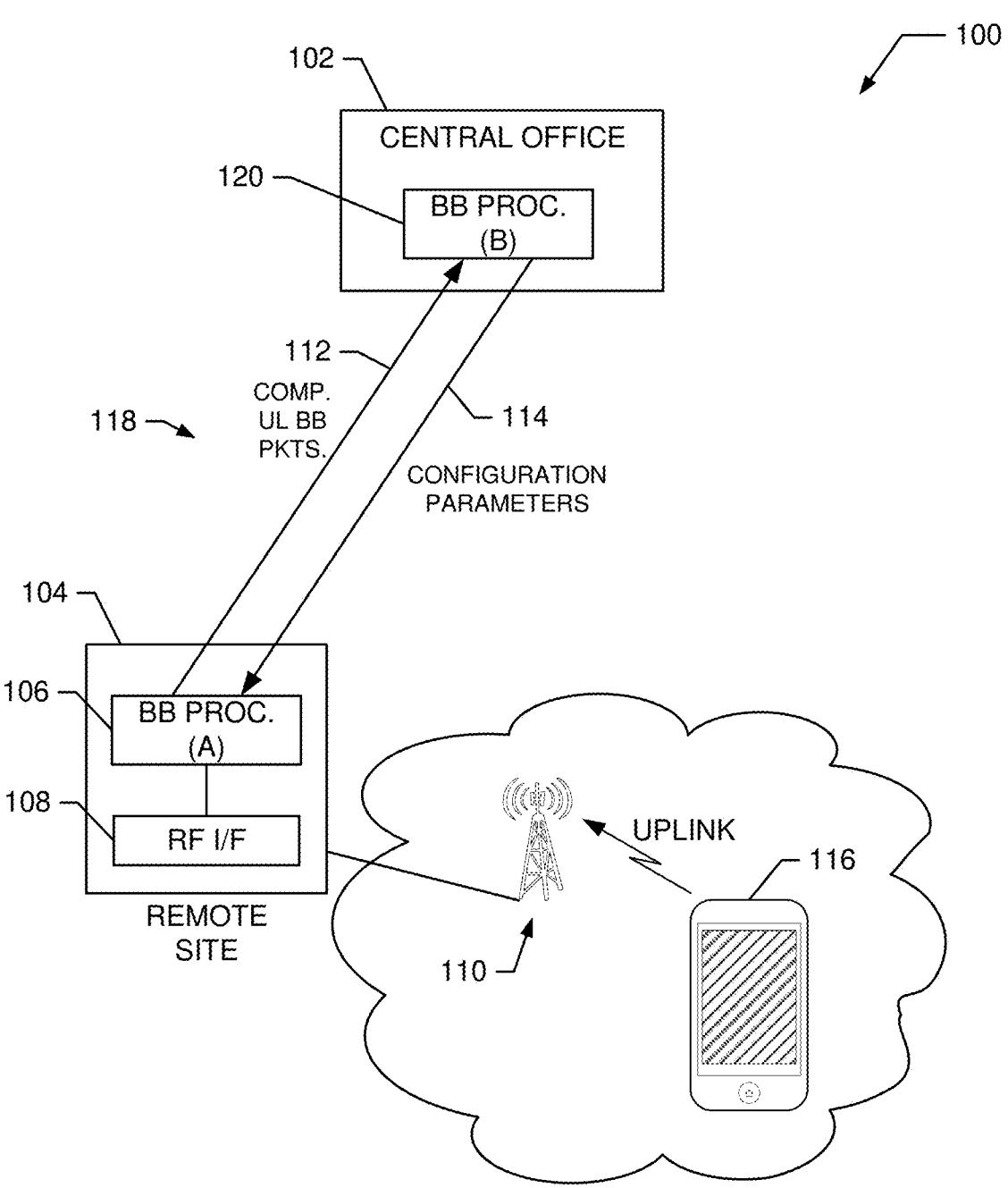
FIG. 1 shows a block diagram of a communication network that includes an exemplary embodiment of a distributed uplink baseband processing system.

Aspects of the present invention are described below in the context of methods and apparatus for compression of 5G new radio uplink signals.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a block diagram of a communication network 100 that includes an exemplary embodiment of a distributed uplink baseband processing system. The network 100 may operate as a fourth generation ("4G"), Long Term Evolution (LTE), Fifth Generation (5G), New Radio (NR), or combination of 4G and 5G cellular network configurations.

The network 100 includes a central office 102 and remote site 104 that communication with each other using transmission lines 118. In an embodiment, the central office 102 and remote site 104 are separated by a large distance. The transmission lines 118 are optical fiber or other suitable transmission medium.

The remote site 104 comprises baseband (BB) processing section (A) 106 and an RF interface 108. The RF interface 108 receives uplink communications from user equipment, such as user equipment 116, using antenna 110. The RF interface 108 provides the received uplink communications to the baseband processing section 106. The BB processing section 106 performs a first portion of baseband processing of the received uplink communications and generates compressed uplink BB packets 112 that are transmitted to the central office 102 using the transmission lines 118.

In an embodiment, the central office 102 comprises a baseband processing section (B) 120 that receives the compressed uplink baseband packets 112 and performs additional baseband processing functions to obtain the transmitted uplink information. In an embodiment, the baseband processing section (B) 120 generates configuration parameters 114 that are transmitted to the remote site 104 using the transmission lines 118. The configuration parameters 114 are used by the baseband (BB) processing section (A) 106 to control the compression process used to generate the packets 112.

Thus, the network 100 illustrates a distributed baseband processing system that efficiently utilizes transmission lines between the central office 102 and the remote site 104. The baseband processing section (A) 106 at the remote site 104 performs a portion of the baseband processing to generate compressed packets 112 that are transmitted over the transmission lines 118 to the central office 102. The compressed packets 112 contain the received uplink data in compressed format without loss to efficiently utilize the transmission lines 118, thereby allowing the use of less expensive transmission line or to allow more channels of information to be transmitted over existing transmission lines. A more detailed description of the distributed baseband processing system is provided below.

Figure 2:
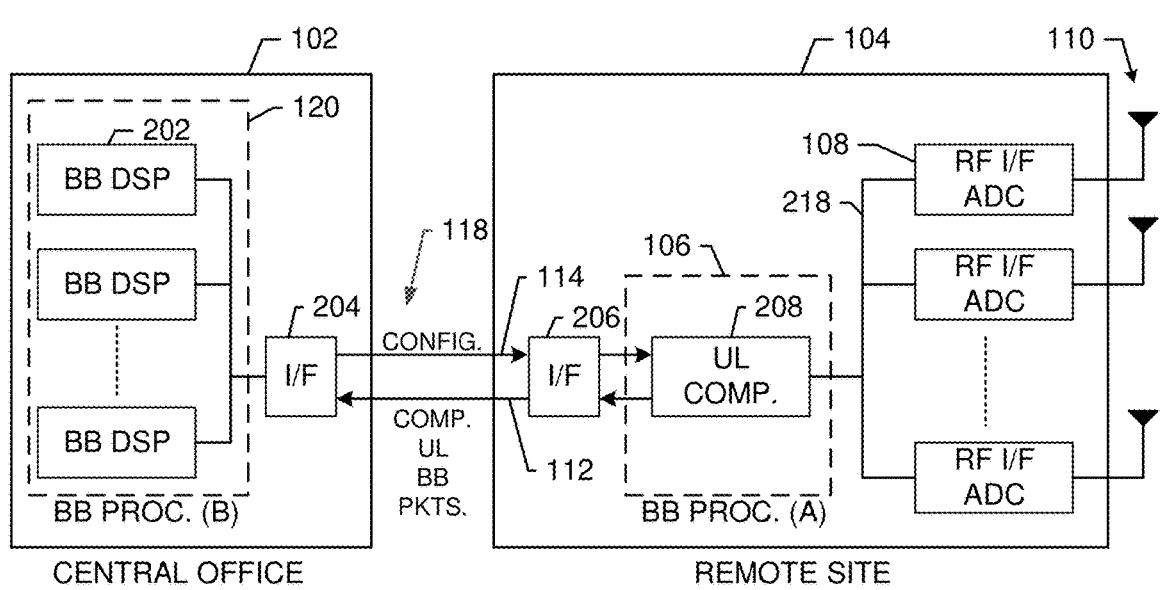
FIG. 2 shows an exemplary detailed embodiment of a central office and remote site shown in FIG. 1.

FIG. 2 shows an exemplary detailed embodiment of a central office 102 and remote site 104 shown in FIG. 1. In an embodiment, the central office 102 includes one or more baseband (BB) DSPs, such as DSP 202, that are part of the BB processing section (B) 120. The central office 102 also includes an interface 204 that transmits and receives information over transmission lines 118. In an embodiment, the DSPs, such as DSP 202, transmit the configuration parameters 114 to the remote site 104 using the interface 204 and transmission lines 118.

The remote site 104 includes an interface 206 that receives the configuration parameters 114 and passes this information to an uplink compressor 208 that is part of the BB processing section (A) 106. The compressor 208 compresses uplink signals received by one or more RF interfaces, such as RF interface 108. For example, each RF interface receives uplink transmissions using antennas, such as antenna 110, and converts the received analog signals to digital format using analog-to-digital (ADC) converters. Thus, the RF interfaces generate time domain uplink signals 218 that are passed to the uplink compressor 208. The uplink compressor 208 compresses the received uplink signals according to the received configuration parameters 114 and generates compressed uplink baseband packets 112 that are transmitted to the central office 102 using the interface 206 and transmission lines 118. In various embodiments, any type of packetized transmission format can be utilized.

Figure 3:
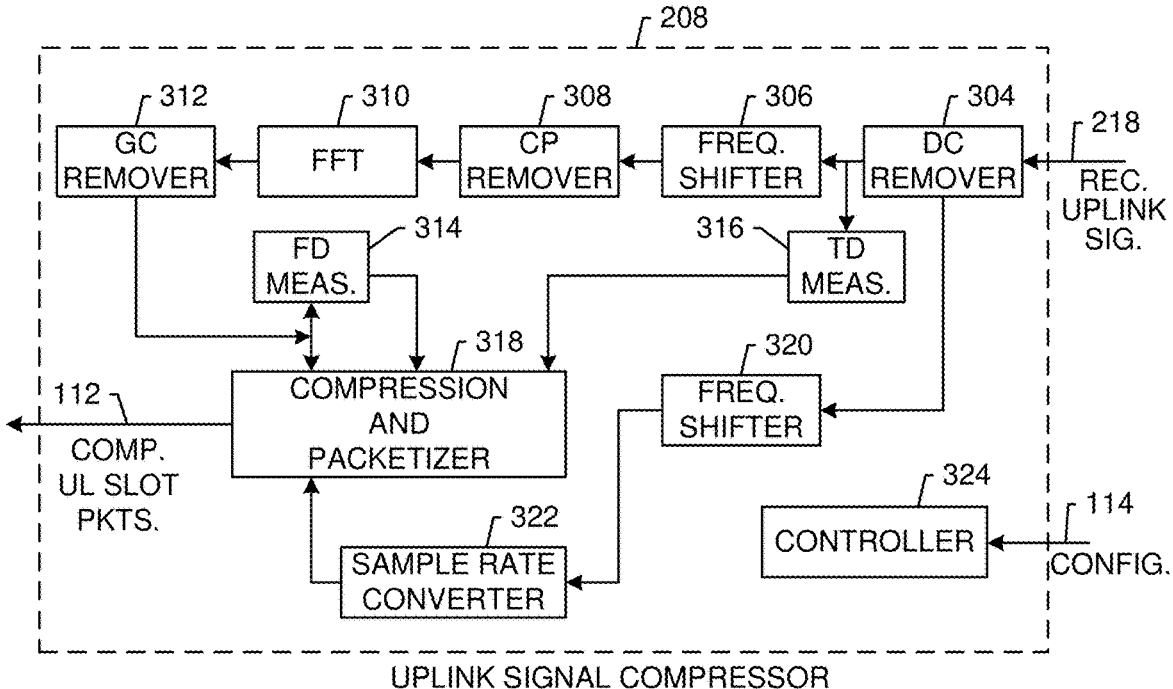
FIG. 3 shows a detailed embodiment of the uplink compressor shown in FIG. 2.

FIG. 3 shows a detailed embodiment of the uplink compressor 208 shown in FIG. 2. In an embodiment, the compressor 208 comprises DC remover 304, frequency shifter 306, cyclic prefix (CP) remover 308, FFT block 310, guard carrier (GC) remover 312, frequency domain power measurement circuit 314, time domain power measurement circuit 316, compression and packetizer 318, frequency shifter 320, sample rate converter 322, and controller 324.

During operation, digital time domain uplink baseband signals 218 output from the RF interfaces (e.g., 108) are input to the DC remover 304 of the compressor 208. The DC remover 304 removes a DC bias from the uplink time domain signals and outputs a DC adjusted signal that is input to the frequency shifter 306 and the time domain (TD) measurement circuit 316. The frequency shifter 306 shifts the frequency of the signal it receives and outputs a frequency shifted signal that is input to the CP remover 308. The CP remover removes the cyclic prefix and outputs a CP removed signal that is input to the FFT block 310. The FFT block 310 performs a Fourier transform of the CP removed signal to generate a frequency domain signal that is input to the GC remover 312. The GC remover 312 generates a GC removed signal that is input to the frequency domain measurement circuit 314 and the compression and packetization block 318. The time domain measurement circuit 316 performs a time domain power measurement and outputs the result to the compression and packetizer 318. The frequency domain measurement circuit 314 performs a frequency domain power measurement and outputs the result to the compression and packetizer 318.

The output of the DC remover 304 is also input to the frequency shifter 320 which shifts the frequency of the signal it receives to isolate a user access preamble (UAP) and outputs a frequency shifted signal that isolates the UAP to the sample rate conversion block 322. The sample rate conversion block 322 rate converts the UAP and inputs a rate converted UAP to the compression and packetizer 318.

The compression and packetizer 318 performs compression on the baseband signals and generates the compressed uplink baseband packets 112 for transmission to the central office 102 using the transmission lines 118. A more detailed description of the operation of the compression and packetizer 318 is provided below.

In an embodiment, the controller 324 receives the configuration parameters 114 and uses these parameters to control the operation of the uplink compressor 208. For example, the controller 324 uses the configuration parameters 114 to control the operation of the FFT block 310, CP remover 308, DC remover 304, frequency shifters 306 and 320, and the rate converter 322. More information about the configuration parameters 114 is provided below.

Configuration Parameters

In an embodiment, the controller 324 controls the operation of the uplink compressor 208 based on received configuration parameters 114. The following is a non-exhaustive list of configuration parameters utilized by the controller 324. It should be noted that in other embodiments, other configuration parameters may be utilized.

Figure 4:
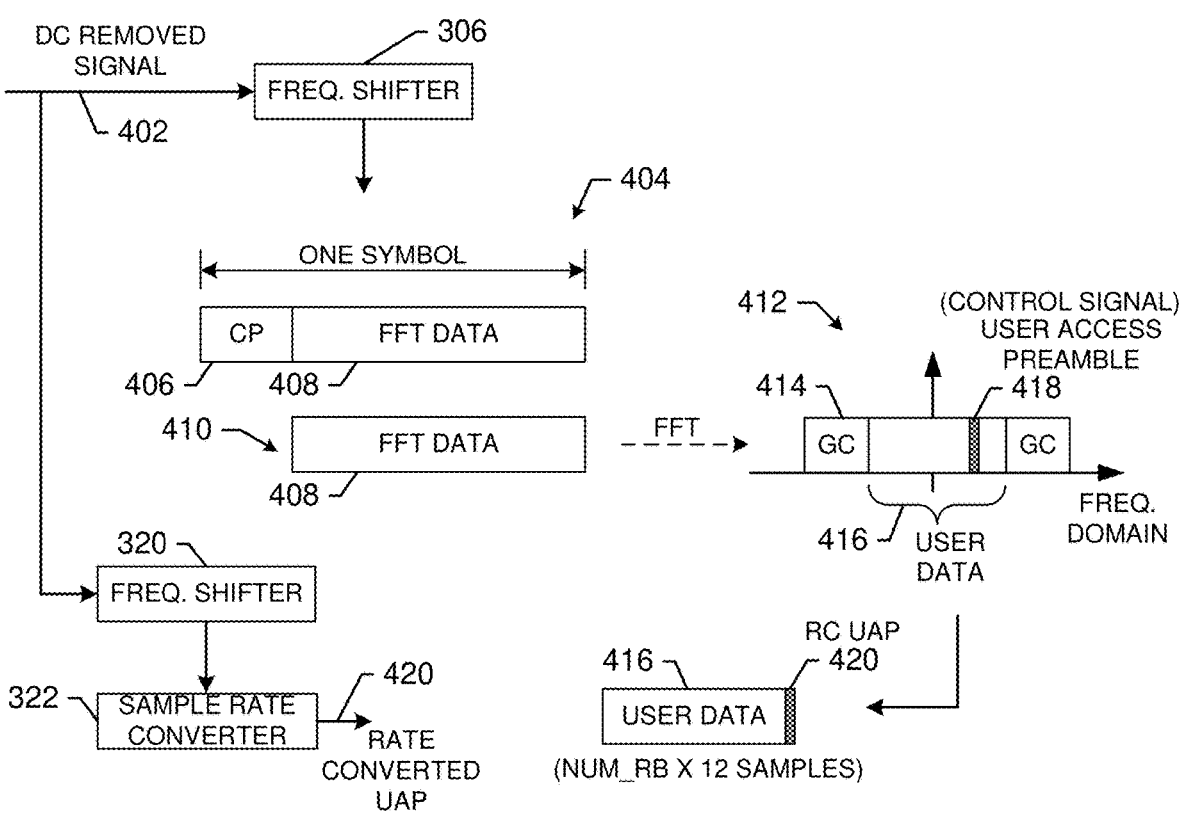
FIG. 4 illustrates how 4G/5G uplink baseband signals are processed and input to the compression and packetizer in an embodiment of the uplink compressor.

1. Logical Antenna index
2. FFT size
3. Cyclic prefix size
4. Subcarrier spacing
5. Number of Resource Blocks
6. DC removal (on/off)
7. Frequency shift (Hz)
8. Half-tone down shift (on/off)
9. User defined phase rotation
10. FFT Input signal scale
11. CP removal offset
12. Antenna calibration (on/off)
13. PRACH rate converter (on/off)
14. PRACH Frequency shift
15. Rate Conversion ratio FIG. 4 illustrates how 4G/5G uplink baseband signals are processed and input to the compression and packetizer 318 in an embodiment of the uplink compressor 208. During operation, a received uplink signal is input to the DC remover 304 that generates a DC removed signal 402 that is input to the frequency shifter 306, and the frequency shifter 320 as described above. The frequency shifter 306 generates a frequency shifted output 404 that comprises a cyclic prefix 406 and FFT data 408. The frequency shifted output 404 is input to the CP remover 308, which removes the CP 406 to generate a CP removed signal 410 that comprises the FFT data 408. The FFT data 408 is input to the FFT block 310 that performs a Fourier transform to generate the frequency domain signal 412 that comprises guard carriers 414 and user data 416. The frequency domain signal 412 also shows the location of a user access preamble 418, which can also be referred to as a control signal. The frequency domain signal 412 is input to the GC remover 312 that removes the guard carriers 414 and outputs the user data 416 to the compression and packetizer 318. In an embodiment, the user data 416 comprises twelve samples per resource block (e.g., num_rb×12 samples). The GC remover also provides the user data to the frequency domain measurement circuit 314.

The DC removed signal 402 is also input to the frequency shifter 320 that frequency shifts this signal to allow isolation of the UAP 418. The sample rate converter 322 rate comprises a low pass filter that filters the frequency shifted signal output form the frequency shifter 320 to isolate the UAP 418 and rates converts the UAP 418 to generate the rate converted (RC) UAP 420, which is also input to the compression and packetizer 318. In an embodiment, the compression and packetizer 318 operates to compress and packetize the information it receives to generate the compressed uplink baseband packets 112 as described in more detail below.

Figure 5:
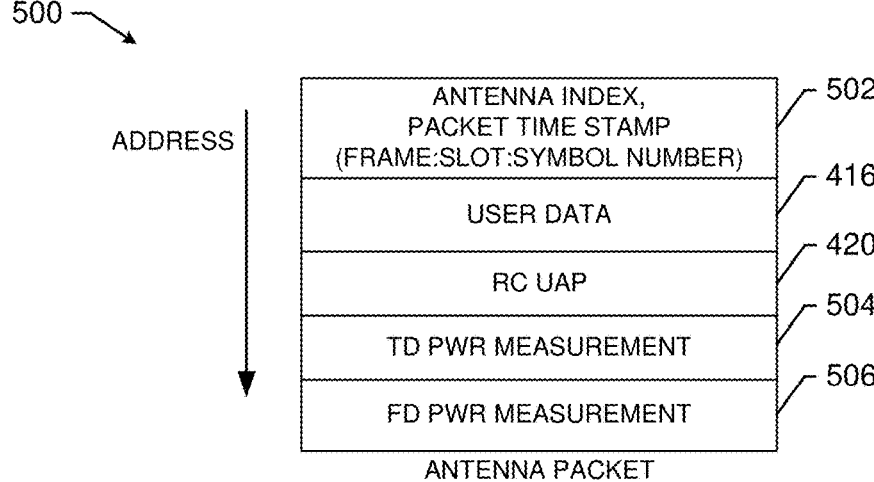
FIG. 5 shows an exemplary compressed antenna packet generated by an exemplary embodiment of the compression and packetizer shown in FIG. 3.

FIG. 5 shows an exemplary compressed antenna packet 500 generated by an exemplary embodiment of the compression and packetizer 318 shown in FIG. 3. During operation, the compression and packetizer 318 generates the antenna packet 500 to have a header 502 that comprises an antenna index, packet time stamp, and a (frame: slot: symbol) number, which identifies the packet. The user data 416 and rate converted UAP 420 are also inserted into the packet 500. The packet also includes a time domain power measurement 504 measured by the TD measurement circuit 316 and a frequency domain power measurement 506 measured by the FD measurement circuit 314.

Figure 6:
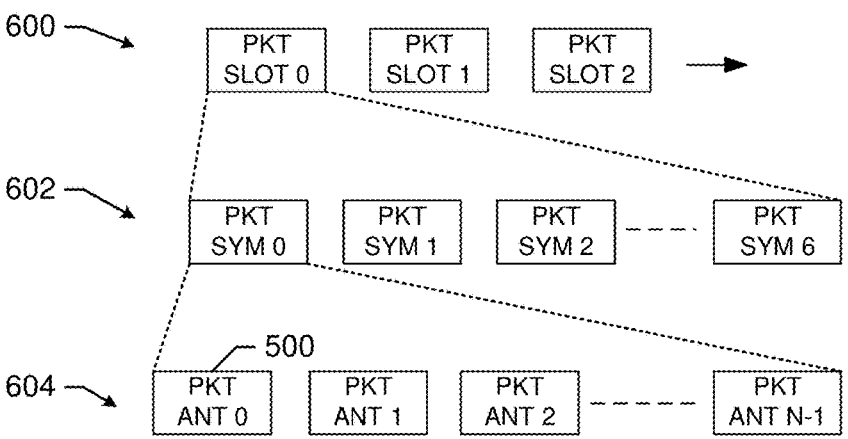
FIG. 6 shows exemplary slot packets generated by an exemplary embodiment of the compression and packetizer shown in FIG. 3.

FIG. 6 shows exemplary slot packets 600 generated by an exemplary embodiment of the compression and packetizer 318 shown in FIG. 3. In an embodiment, each slot packet comprises seven symbol packets 602 and each symbol packet comprises up to N antenna packets 604. Thus, the compression and packetizer 318 generates a stream of slot packets and each slot packet comprises a selected number of antenna packets that contain a selected amount of baseband data. It should be noted that since each slot packet includes identification information, the stream of slot packets can be transmitted in any order and reassembled at the central office.

Figure 7:
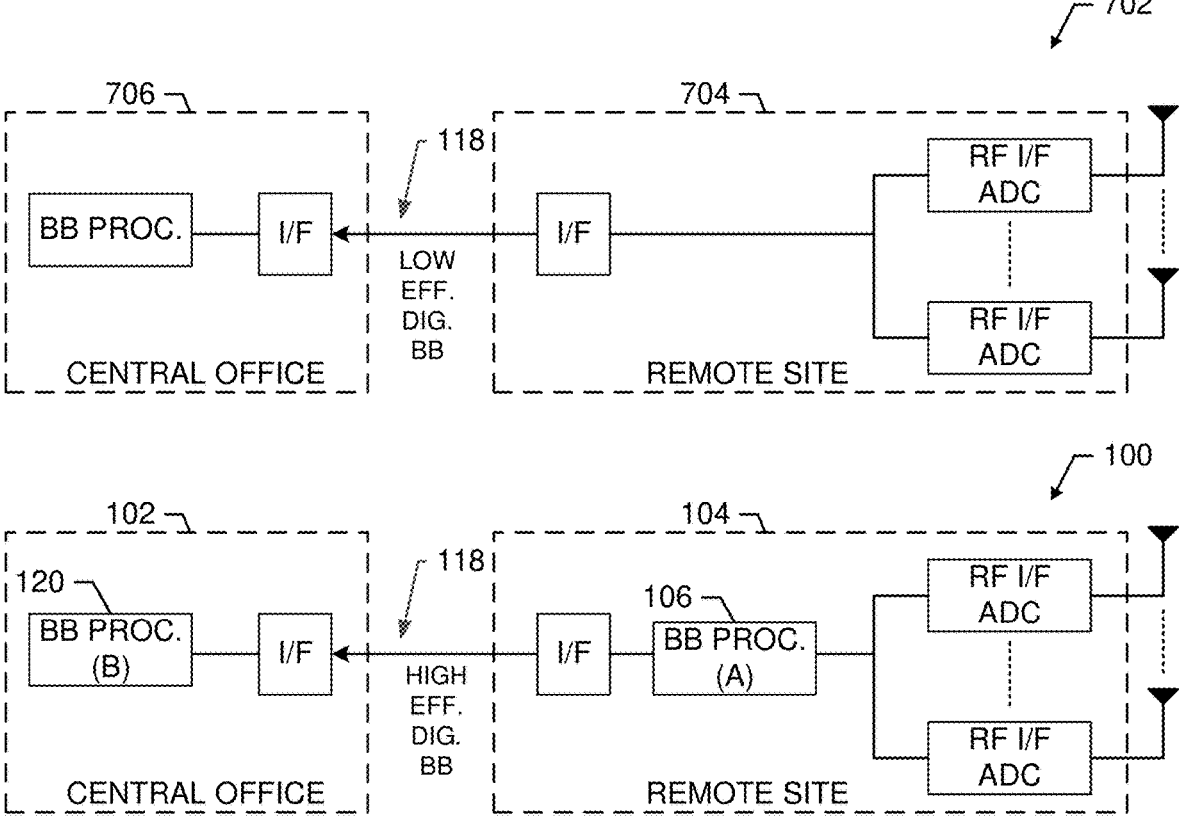
FIG. 7 illustrates how embodiments of the distributed baseband compression system transmit uplink signals from a remote site to a central office with greater efficiency than conventional systems.

FIG. 7 illustrates how embodiments of the distributed baseband compression system transmit uplink signals from a remote site to a central office with greater efficiency than conventional systems. FIG. 7 shows a conventional uplink processing system 702 in which received uplink RF signals are digitized at a remote site 704 and transmitted as low efficiency digital baseband signals over transmission lines 118 to a central office 706. All of the baseband processing is performed at the central office, such that all the overhead and extra information is transmitted to the central office 706 for baseband processing. Thus, the received uplink communications are transmitted over the transmission lines 118 with low efficiency.

In contrast, the distributed baseband compression system 100 operates to perform a first portion of baseband processing at the remote site 104. For example, the BB processing section (A) 106 performs a first portion of the baseband processing at the remote site 104 and the BB processing section (B) 120 performs a second portion of the baseband processing at the central office 102. Since a portion of the baseband processing is performed at the remote site 104, the system 100 generates high efficiency compressed baseband packets that are transmitted over the transmission lines 118. Thus, the transmission lines 118 are more efficiently utilizes by embodiments of the system 100.

FIG. 8 shows an exemplary method 800 for performing uplink baseband compression in accordance with exemplary embodiments of a distributed baseband processing system. For example, the method 800 is suitable for use with the uplink compressor 208 shown in FIG. 2.

At block 802, uplink transmission are received at a front end. For example, the uplink transmission from user equipment are received by the RF front end 108 at the remote site 104.

At block 804, the received uplink transmissions are passed to first baseband processing section. For example, the uplink transmissions received by the front end 108 are passed to the uplink compressor 208 of the first baseband processing section 106.

At block 806, configuration information is received by the first baseband processing section. For example, the configuration information 114 transmitted over the transmission lines 118 by the central office 102 to the remote site 104 is received by the interface 206 and passed to the uplink compressor 208 of the first baseband processing section 106.

At block 808, a DC bias is removed from the received uplink transmission. For example, the DC remover 308 removes a DC bias from the received uplink transmission 218 to generate a DC removed transmission.

At block 810, the DC removed transmission is frequency shifted. For example, the frequency shifter 306 frequency shifts the DC removed transmission to generate a frequency shifted transmission.

At block 812, a cyclic prefix is removed from the frequency shifted transmission. For example, the CP remover 308 removes a CP from the frequency shifted transmission to generate a CP removed transmission.

At block 814, a FFT is performed on the CP removed transmission. For example, the FFT block 310 performs an FFT on the CP removed transmission to generate a frequency domain transmission.

At block 816, a guard carrier is removed from the frequency domain transmission. For example, the GC remover 312 removes the GC from the frequency domain transmission to generate a GC removed transmission.

At block 818, the DC removed transmission is frequency shifted. For example, the frequency shifter 320 frequency shifts the DC removed transmission to generate a second frequency shifted transmission.

At block 820, a sample rate conversion is performed on the second frequency shifted transmission. For example, the sample rate converter 322 performs a low pass filter to isolate the UAP signal and a rate conversion on the second frequency shifted transmission to generate a rate converter UAP signal.

At block 822 the GC removed transmission and the rate converted UAP are used to generate compressed baseband signal packets. For example, the compression and packetizer 318 receives the GC removed transmission and the rate converted transmission and generates the compressed baseband signal packets 112. In an embodiment, the compression is performed based on the received configuration parameters. For example, the packets are generated as illustrated in FIGS. 5-6.

At block 824, the compressed BB signal packets are transmitted to a central facility using the transmission lines 218. Since a portion of the baseband processing is performed at the remote site 104, which remotes unnecessary information, the transmission of the compressed BB signal packets to the central office 102 using the transmission lines 118 is very efficient.

Thus, the method 800 operates to perform uplink baseband compression in accordance with exemplary embodiments of a distributed baseband processing system. It should be noted that the operations of the method 800 can be modified, added to, deleted, rearranged, or otherwise changed within the scope of the embodiments.

While particular embodiments of the present invention have been shown and described, it will be obvious to those skilled in the art that, based upon the teachings herein, changes and modifications may be made without departing from the exemplary embodiments of the present invention and its broader aspects. Therefore, the appended claims are intended to encompass within their scope all such changes and modifications as are within the true spirit and scope of this exemplary embodiments of the present invention.

What is claimed is:

1. An apparatus for facilitating network data processing comprising:
   a radio frequency ("RF") interface configured to receive uplink transmissions containing data;
   a direct current ("DC") remover coupled to the RF interface and configured to generate DC adjusted signals by removing DC bias from the received uplink transmissions;
   a time domain ("TD") measurement circuit coupled to the DC remover and configured to measure a TD power level associated with the DC adjusted signals; and
   a compression block coupled to the TD measurement circuit and operable to generate compressed uplink base band packets in response to the uplink transmissions and the TD power level.

2. The apparatus of claim 1, further comprising a first frequency shifter coupled to the DC remover and configured to shift the DC adjusted signals to generate a frequency shifted signals.

3. The apparatus of claim 1, further comprising a cyclic prefix ("CP") remover coupled to the DC remover and operable to remove CP from frequency shifted signals in accordance with the DC adjusted signals.

4. The apparatus of claim 1, further comprising a Fourier transform ("FT") block coupled to the DC remover and operable to generate frequency domain signals in response to the DC adjusted signals.

5. The apparatus of claim 1, further comprising a guard carrier ("GC") remover coupled to the DC remover and configured to generate GC removed signals in response to GC removed frequency domain signals based on DC adjusted signals.

6. The apparatus of claim 1, further comprising a frequency domain measurement circuit coupled to the DC remover and operable to that measures a power level of the GC removed signals.

7. The apparatus of claim 1, further comprising a second frequency shifter coupled to the DC remover and configured to generate an isolated user preamble signal via frequency shifting of the DC adjusted signals to generate an isolated user access preamble signal.

8. The apparatus of claim 7, further comprising a rate converter coupled to the DC remover and operable to generate a rate converted user access preamble signal by converting rate associated to the isolated user access preamble signal.

9. The apparatus of claim 1, wherein the compression block includes a first baseband processing section capable of generating antenna packets in accordance with at least one of the GC adjusted signal, rate converted user access preamble, power levels of the DC adjusted signals, and power levels of the GC removed signals.

10. The apparatus of claim 1, wherein the compression block includes a first baseband processing section capable of adding an identifying header to antenna packets and combine the antenna packets into symbol packets.

11. The apparatus of claim 1, wherein the symbol packets are combined and placed into slot packets that form compressed packets.

12. The apparatus of claim 11, wherein the compression block forwards the compressed packets to a central office via one or more transmission mediums.

13. The apparatus of claim 1, wherein the RF interface receives the uplink transmissions as one of 4G, 5G, or Wi-Fi transmissions.

14. A method for transmitting data packets via a network communication, comprising:
receiving, by a remote site, uplink transmissions carrying user data from a user equipment via a wireless network;
removing direct current ("DC") bias from the uplink transmissions to generate DC adjusted signals;
generating a time domain ("TD") measurement in response to a measurement of TD power levels associated to the DC adjusted signals; and
compressing the DC adjusted signals in accordance with configuration parameters and the TD measurement to generate compressed packets.

15. The method of claim 14, further comprising obtaining, by a remote site, configuration parameters from a central office via a communication network through transmission lines.

16. The method of claim 14, further comprising transmitting the compressed packets from the remote site to a central office via one or more transmission lines.

17. The method of claim 14, further comprising obtaining user data by a second baseband processing unit after the compressed packets arrive at the central office.

18. The method of claim 14, wherein compressing the uplink transmissions further includes removing a DC bias from the received uplink transmissions to generate DC removed signals.

19. The method of claim 14, wherein compressing the uplink transmissions further includes removing a cyclic prefix from frequency shifted signals to generate cyclic prefix ("CP") removed signals.

20. The method of claim 14, wherein compressing the uplink transmissions further includes performing a Fourier transform on cyclic prefix ("CP") removed signals to generate a frequency domain signals.

21. The method of claim 14, wherein compressing the uplink transmissions further includes removing guard carriers ("GC") from the frequency domain signals to generate GC removed signals.

22. The method of claim 14, further comprising generating a frequency domain ("FD") measurement via a measurement of a power level associated to DC adjusted signals and measuring a power level of the GC removed signals.

23. The method of claim 14, wherein compressing the uplink transmissions includes adding an identifying header to antenna packets and combining the antenna packets into symbol packets.

24. The method of claim 14, wherein compressing the uplink transmissions further includes combining the symbol packets into slot packets that form the compressed packets.

25. The method of claim 14, wherein receiving the uplink transmissions includes receiving uplink transmissions formatted in 5G transmissions.

26. A method of network data processing, comprising:
receiving, by a remote site, uplink transmissions carrying user data;
removing at least one direct current ("DC") bias from the uplink transmissions to generate DC removed signals;
shifting the DC removed signals to generate frequency shifted signals;
generating compressed packets by a first baseband processor based on the frequency shifted signals and configuration parameters; and
transmitting the compressed packets from the remote site to a central office via transmission lines.

27. The method of claim 26, further comprising generating cyclic prefix ("CP") removed signals by removing at least one CP from the frequency shifted signals.

28. The method of claim 26, further comprising obtaining, by a remote site, configuration parameters from a central office via a communication network through transmission lines.

29. The method of claim 26, further comprising removing guard carriers ("GC") from frequency domain signals to generate GC removed signals.

30. The method of claim 26, further comprising generating a frequency domain ("FD") measurement via a measurement of a power level associated to DC removed signals and measurement of power level associated to the GC removed signals.

31. The method of claim 26, further comprising adding an identifying header to antenna packets and combining the antenna packets into symbol packets.

32. An apparatus for transmitting data packets via a network communication, comprising:
means for receiving uplink transmissions carrying user data from a user equipment via a wireless network;
means for removing direct current ("DC") bias from the uplink transmissions to generate DC adjusted signals;
means for generating a time domain ("TD") measurement in response to a measurement of TD power levels associated to the DC adjusted signals; and
means for compressing the DC adjusted signals in accordance with configuration parameters and the TD measurement to generate compressed packets.

33. The apparatus of claim 32, further comprising means for obtaining configuration parameters from a central office via a communication network through transmission lines.

34. The apparatus of claim 32, further comprising means for transmitting the compressed packets from the remote site to a central office via one or more transmission lines.

35. The apparatus of claim 32, further comprising means for obtaining user data by a second baseband processing unit after the compressed packets arrive at the central office.

36. The apparatus of claim 32, wherein means for compressing the uplink transmissions further includes means for removing a DC bias from the received uplink transmissions to generate DC removed signals.

* * * * *